United States Patent
Zhang et al.

(10) Patent No.: US 10,670,625 B2
(45) Date of Patent: Jun. 2, 2020

(54) METHOD FOR ERROR CORRECTION IN SCANNING PROBE MICROSCOPY

(71) Applicant: UNIVERSITY OF FLORIDA RESEARCH FOUNDATION, INCORPORATED, Gainesville, FL (US)

(72) Inventors: Xiaoguang Zhang, Gainesville, FL (US); Xianqi Li, Malden, MA (US); An-Ping Li, Oak Ridge, TN (US); Hao Zhang, Seattle, WA (US); Yunmei Chen, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 2 days.

(21) Appl. No.: 16/316,385

(22) PCT Filed: Jul. 12, 2017

(86) PCT No.: PCT/US2017/041740
§ 371 (c)(1),
(2) Date: Jan. 9, 2019

(87) PCT Pub. No.: WO2018/031174
PCT Pub. Date: Feb. 15, 2018

(65) Prior Publication Data
US 2019/0369138 A1    Dec. 5, 2019

Related U.S. Application Data

(60) Provisional application No. 62/361,397, filed on Jul. 12, 2016.

(51) Int. Cl.
G01Q 30/06    (2010.01)

(52) U.S. Cl.
CPC ..................... *G01Q 30/06* (2013.01)

(58) Field of Classification Search
CPC ........................................... G01Q 30/06
See application file for complete search history.

(56) References Cited

U.S. PATENT DOCUMENTS 6,097,197 A      8/2000   Matsuyama et al.
7,770,439 B2 *   8/2010   Mininni ................ B82Y 35/00
                                                        73/105

(Continued)

OTHER PUBLICATIONS

International Searching Authority, International Search Report and Written Opinion for Application No. PCT/US17/41740, dated Feb. 22, 2018, 20 pages, United States Patent and Trademark Office, U.S.A.

*Primary Examiner* — Nicole M Ippolito
*Assistant Examiner* — Sean M Luck
(74) *Attorney, Agent, or Firm* — Alston & Bird LLP

(57) ABSTRACT

Disclosed here is a scanning probe microscope system and method for operating the same for producing scanning probe microscope images at fast scan rates and reducing oscillation artifacts. In some embodiments, an inverse consistent image registration method is used to align forward and backward scan traces for each line of the scanning microscope image. In some embodiments, the aligned forward and backward scan traces are combined using a weighting factor favoring the scan trace with higher smoothness. In some embodiments, the scanning probe microscope image is a potentiometry map and a method is provided to extract from the potentiometry map a conductivity map.

25 Claims, 11 Drawing Sheets

(56) References Cited

U.S. PATENT DOCUMENTS

| | | | |
|---|---|---|---|
| 2001/0030286 A1 | 10/2001 | Egawa et al. | |
| 2004/0028168 A1 | 2/2004 | Suvorov et al. | |
| 2007/0033991 A1* | 2/2007 | Rice | B82Y 35/00 |
| | | | 73/105 |
| 2008/0236259 A1* | 10/2008 | Kurenuma | G01Q 10/065 |
| | | | 73/105 |
| 2009/0077697 A1* | 3/2009 | Su | G01Q 30/04 |
| | | | 850/52 |
| 2011/0191917 A1 | 8/2011 | Abramovitch | |
| 2013/0032495 A1* | 2/2013 | Unwin | G01Q 60/60 |
| | | | 205/790.5 |
| 2015/0069233 A1 | 3/2015 | Anderson et al. | |

* cited by examiner

METHOD FOR ERROR CORRECTION IN SCANNING PROBE MICROSCOPY

CROSS REFERENCE TO RELATED APPLICATIONS

This application is a National Stage Application, filed under 35 U.S.C. § 371, of International Application No. PCT/US2017/041740, filed Jul. 12, 2017, which claims priority to and the benefit of U.S. Provisional Patent Application Serial No. 62/361,397, filed Jul. 12, 2016, the entire contents of which are incorporated herein by reference.

GOVERNMENT FUNDING

This invention was made with government support under grant number DMS1319050, awarded by the National Science Foundation (NSF). The government has certain rights in the invention.

FEDERALLY SPONSORED RESEARCH

This invention was made with government support under prime contract DE-AC05-00OR22725, subcontract 4000143929, awarded by the U.S. Department of Energy (DOE). The government has certain rights in the invention.

BACKGROUND

The present application is generally related to the field of scanning probe microscopy (SPM) techniques such as scanning tunneling microscopy (STM). The invention of SPM techniques has revolutionized the study of nanoscale and atomic scale surface structures and properties. SPM has been a particularly useful tool for studying surfaces and new two dimensional (2D) materials such as graphene and topological insulators. In a typical application, a scanning probe is controlled by a SPM controller to scan across the surface of a sample material along x- and y-directions in order to produce a raster scan image. The total area of the scan image corresponds to the total scan area of the scanning probe over the sample surface. In some SPM applications, each pixel of the scan image comprises signal intensity that may correspond essentially to the sample height signal in the z-direction at each location along the scan path of the scanning probe tip, such that the produced scan image represent a topographical image. The nature of the signal intensity recorded in each pixel of the scan image depends on the interaction model of the scanning probe tip with the atoms of the sample surface.

In the case of STM, the magnitude of a tunneling current between the conductive STM probe tip and the atoms on the sample surface is a sensitive function of the distance between the STM probe tip and the sample surface. Therefore a topographical height image of the sample surface inside a scan area can be produced by the STM controller based on the probe current at each location of a raster scan path.

Recently, applications of SPM techniques in materials science research have extended from mapping precise surface topographical information to mapping physical properties such as measurements of surface potential, electric polarization, magnetization etc.

SUMMARY

According to some embodiments, a scanning probe microscope system for forming an image of a sample surface is disclosed. The scanning probe microscope system comprises a scanning probe tip configured to provide an output representing a characteristic of the sample surface adjacent the scanning probe tip; a scan controller configured to control motion of the scanning probe tip along a plurality of scan paths in a scan area on the sample surface. Each of the plurality of scan paths comprises a first scan path portion along a first scan direction and a respective second scan path portion along a second scan direction opposite the first scan direction such that the scan controller outputs scan traces corresponding to each of the first scan path portion and the second scan path portion in the plurality of scan paths. The scanning microscope system further comprises one or more processors configured to receive scan traces from the scan controller and compute a scanning probe microscope image of the scan area. The one or more processors are configured to generate the scanning probe microscope image from the scan traces by computing data representing lines of the scanning probe microscope image from data in the scan paths based on scan traces corresponding to the first scan path portion and a respective second scan path portion in respective scan paths of the plurality of scan paths.

According to some embodiments, a method of processing scanning probe microscope data with one or more processors is disclosed. The scanning probe microscope data comprises a plurality of scan traces representing a characteristic of a sample surface measured at locations along a plurality of scan paths in a scan area. Each of the plurality of scan paths comprises a first scan path portion along a first scan direction and a second scan path portion along a second scan direction opposite the first scan direction. The plurality of scan traces comprise a first scan trace along the first scan path portion and a second scan trace along the second scan path portion of at least one scan path of the plurality of scan paths. The method comprises aligning the first scan trace and the second scan trace such that the location of at least one feature in the aligned first scan trace is substantially aligned with the location of at least one corresponding feature in the aligned second scan trace. The method further comprises generating weighting factors based on the aligned first scan trace and the aligned second scan trace; combining the aligned first scan trace with the aligned second scan trace based, at least in part, on the generated weighting factors to produce a processed scan trace along the at least one scan path, and producing, by the one or more processors, a scanning probe microscope image, based at least in part on the processed scan trace.

According to some embodiments, a non-transitory computer-readable storage medium is disclosed. The non-transitory computer-readable storage medium is encoded with a plurality of instructions that, when executed by one or more processors in a scanning probe microscope system comprising a scan controller and a scanning probe tip perform a method. The method comprises receiving, scan traces representing a characteristic of the sample surface measured at scanning probe tip locations along a plurality of scan paths in a scan area. Each of the plurality of scan paths comprises a first scan path portion along a first scan direction and a second scan path portion along a second scan direction opposite the first scan direction. The method further comprises aligning a first scan trace along the first scan path portion and a second scan trace along the second scan path portion of at least one scan path of the plurality of scan paths such that the location of at least one feature in the aligned first scan trace is substantially aligned with the location of at least one corresponding feature in the aligned second scan trace; combining the aligned first scan trace with the aligned second scan trace based, at least in part, on the generated weighting factors to produce a processed scan trace along the at least one scan path and producing, the scanning probe microscope image based at least in part on the processed scan trace.

The foregoing is a non-limiting summary of the invention, which is defined by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
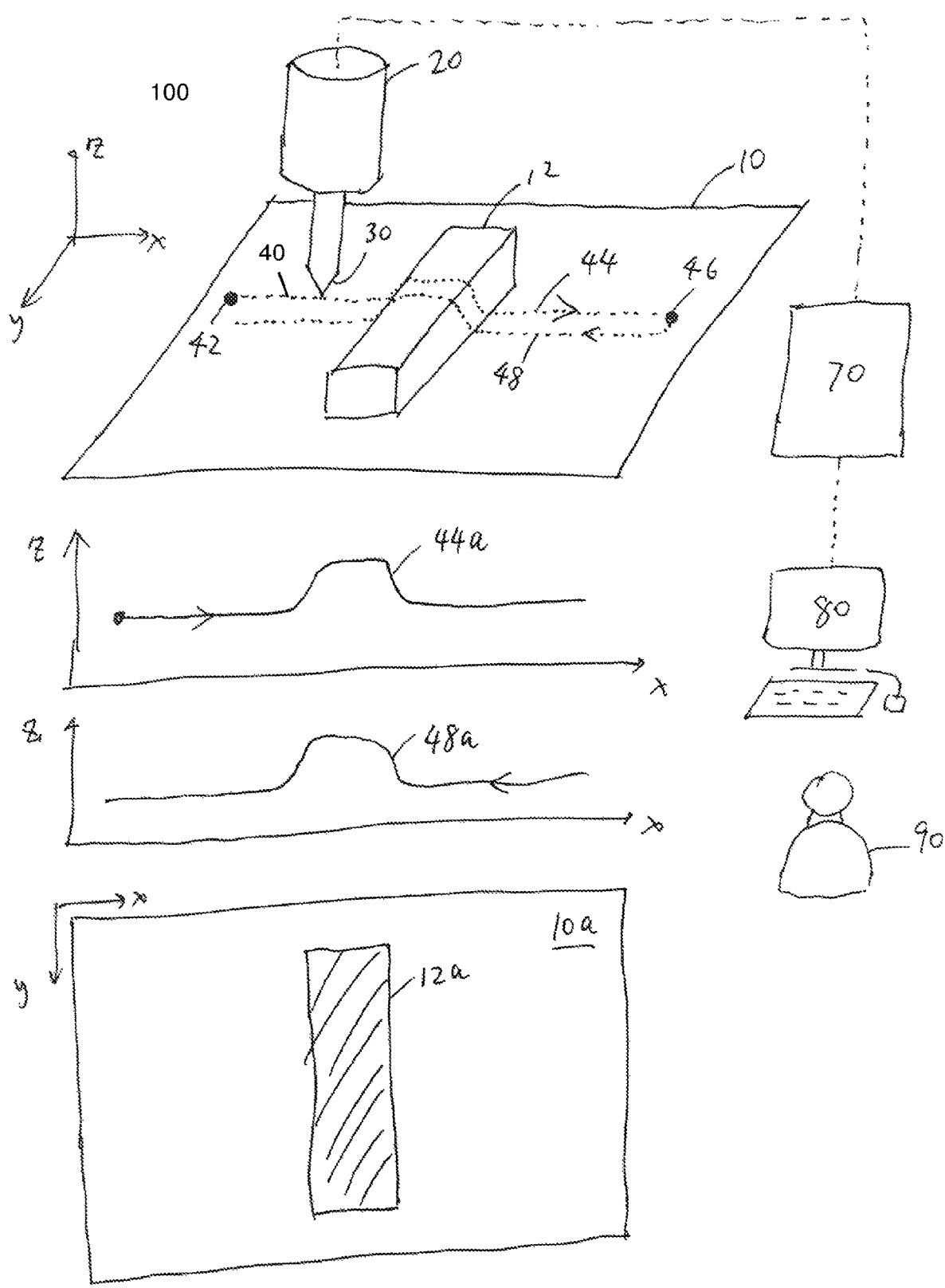
FIG. 1 is a schematic diagram showing components of an exemplary scanning tunneling microscope system and illustrative examples of scan traces.

The inventors have recognized and appreciated techniques that may be used to acquire accurate scanning images. During operation of a scanning probe microscope system, a scanning probe tip is moved across a scan area of a sample surface to acquire a scanning microscope image. The tip movement may comprise forward movement and backward movement along a series of scan lines that correspond to lines of pixels in a scanning probe microscope image.

In forming such an image, scan rate and accuracy can be inversely related. Depending on noise, sample drift, accuracy of probe tip movement and other factors, data captured during a scan may comprise artifacts. For example, a probe tip may oscillate closer and farther away from the sample surface during movement along a scan line. When the microscope hardware does not correct such probe tip oscillation in a timely manner, data acquired during the scan may comprise oscillation artifacts even though such feature is absent from the sample surface.

A conventional approach to avoiding the effects of oscillations on the measurements is to move the tip more slowly, which might both reduce the excitation of such oscillations and allow them to die down before each measurement is taken. Thus, eliminating the effects of the oscillations to produce more accurate measurements led to longer scan times.

The inventors have recognized and appreciated that, because the probe tip covers essentially the same scan area twice, once during forward tip movements and once during backward tip movements, the redundancy between the data acquired during forward tip movement and backward tip movement may be utilized to reduce the effects of oscillation without increasing time to make measurements. In accordance with some embodiments, measurements made along the forward and backward portions of each scan path may be combined to produce a single scanning probe microscope image that accurately represent a characteristic of the sample surface inside the scan area.

In some cases, an artifact may be present in a portion of a forward scan but absent from a corresponding backward scan along a similar area. Similarly, portions of a backward scan may give rise to artifacts in the data acquired while the forward scan is a better representation of the actual sample surface. By selectively processing data from both forward and backward directions of scans, a single scanning probe microscope image may be produced such that each pixel location constitutes scan data based substantially on data from the scan direction with a characteristic that is identified to be less affected by artifacts at a corresponding location on the scan line. In some embodiments, the selective processing involves determining, based on the characteristics of the forward and backward portions of a scan, a weighting for each location of each portion, such that the selective processing may be achieved by forming a weighted combination of the values measured at corresponding location of the forward and backward portions of a scan.

In some embodiments, processing based on data acquired during forward and backward tip movement may be performed during the scanning process such that a processed scanning probe microscope image may be produced in real-time. However, it should be appreciated that in other embodiments, the processing may be performed off line, in any suitable computer processing equipment configured to receive the scan data.

According to some embodiments, a scanning probe microscope system such as system 100 in FIG. 1 may be used to form a scanning probe microscope image 10a that corresponds to a scan area 10 of a sample surface. The scanning probe microscope system 100 includes a scanning probe tip 30 that is controlled by scan controller 70 to measure a characteristic of the sample surface in scan area 10 adjacent the scanning probe tip 30. Scan controller 70 controls the motion of the scanning probe tip 30 to move along a plurality of scan paths such as scan path 40 on the sample surface. In some embodiments, a scan path 40 may originate from a point 42 along one side of the scan area 10, proceed in the +x direction (see FIG. 1) towards a second point 46 along an opposite side of the scan area 10, before turning back to proceed in the −x direction. A plurality of scan paths may be provided such that the scanning probe tip 30 is moved to cover the entire surface of the sample inside scan area 10. Each scan path such as scan path 40 comprises a first scan path portion 44 along +x or a forward scan, and a second scan path portion 48 along −x or a backward scan. As the scanning probe tip 30 is moved across the sample surface, the scan controller 70 outputs scan traces corresponding to each of the forward scan and backward scan in the plurality of scan paths. In some embodiments, the forward scan and backward scan portions of a scan path are substantially parallel and aligned to within the separation of two adjacent scan traces. In other embodiments, the separation between the forward scan and backward scan may be adequate if it is within a suitable multiple or fraction of the spacing between adjacent scan paths, such as 2× or 0.5×. In yet another embodiment, the forward scan and backward scan are substantially overlapping.

In some embodiments, scan controller 70 controls motion of probe tip 30 by controlling scan head 20 to move the position of probe tip 30. Probe tip 30 may be coupled to scan head 20 via any suitable translational movement system known in the art. For example, scan head 20 may comprise piezoelectric elements that moves in predefined distances in response to signals from controller 70 along each one of the x-, y- and z-axis as shown in FIG. 1.

In some embodiments, scan controller 70 receives data while probe tip 30 is moved along the scan paths and outputs the data as scan traces corresponding to the scan paths.

Referring to the scanning microscope system 100 in FIG. 1, in some embodiments one or more processors 80 are provided to receive scan traces from the scan controller 70 and produce a scanning probe microscope image 12a of the scan area 10 based on the scan traces. The scanning probe microscope image 12a may be stored, transmitted or further processed in any suitable way. In some embodiments, the scanning probe microscope image 12a may be presented to an operator 90 on a display.

In some embodiments, the one or more processors 80 are configured to generate the scanning probe microscope image 12a from the scan traces by computing data representing lines of the scanning probe microscope image 12a from data in the scan paths based on scan traces corresponding to the forward scan 44 and the respective backward scan 48 in scan paths such as scan path 40 as shown in the example scanning probe microscope system 100 in FIG. 1.

In some embodiments, the one or more processors 80 computes data representing lines of the scanning probe microscope image 12a by first aligning a common feature in the forward scan with a corresponding feature in the backward scan. In the example in FIG. 1, an object 12 comprises raised portions in the z-direction above the rest of the sample surface in scan area 10 and shows in both the scan trace for the forward scan as feature 44a and the scan trace for the backward scan as feature 48a. A registration method may be performed to align the feature 44a in the forward scan trace and feature 48a in the backward scan trace such that the same feature appear in substantially the same location along the scan traces, based on the assumption that both features 44a and 48a correspond to the same object 12 on the sample surface. Although in this example, a global shift along the full length of the scan trace is used to obtain alignment of one feature in each scan trace, in some embodiments a local transformation to align along a portion of the full length of the scan trace may be performed. In yet some other embodiments, multiple features in a scan trace may be used to perform registration between forward and backward scans. According to some aspects, alignment between corresponding features in the aligned forward and backward scan traces may mean the features are aligned within a predefined resolution, for example within a certain fraction of the distance represented by a pixel, such as 50% of a pixel. Depending on the context, other metrics may be used to determine alignment condition between corresponding features in the aligned forward and backward scan traces.

In some embodiments, the aligned forward scan trace and aligned backward scan trace may be processed to produce data representing a line of the scanning probe microscope image. In some embodiments, a scan trace with a higher smoothness may be the scan trace with less artifacts and closer to representation of the actual characteristic of the sample surface. In some embodiments, the forward scan trace and backward scan trace may be combined using a respective weighting factor proportional to smoothness of the traces at each location along the scan path. In one example, a higher smoothness of the traces may correspond to a higher value of weighting factor assigned to the traces.

In some embodiments, feature 12 of the sample surface may be a portion with a height difference and the scanning probe microscope image 10a may be a two dimensional height image showing height features 12a in the image. In some other embodiments, the characteristic of the sample surface may be surface potential and the scanning microscope image 10a is a two dimensional potentiometry map showing potential feature 12a in the scan area.

1 Introduction

The inventors have recognized that scanning probe microscope such as STM has rarely been considered a real-time method because of its slow scanning rate compared to most dynamic processes on a surface. This has severely limited its application to the study of most dynamic processes on surfaces such as surface diffusion, phase transitions, self-assembly phenomena, film growth and etching, chemical reactions, conformational changes of molecules. Raising the scan rate of scanning probes has been the objective of intense research efforts in the past decades, with most of the efforts focused on hardware improvements. On the other hand, researchers have also applied other techniques to utilize conventional, slow-scan STM to study dynamic processes.

The common practice for STM measurement is by bringing the tip close to the sample surface and applying a voltage bias to generate a tunnel current between the tip and sample. The tip is moved across the sample parallel to the surface (in the xy plane). Changes in the surface height z or in the density of states cause a change in the tunneling current. The change in current with respect to position can be measured itself, or alternatively the height of the tip corresponding to a constant current can be measured. These two modes are called the constant height mode and the constant current mode, respectively. In the constant current mode, feedback electronics adjust the height by a voltage to the piezoelectric height control mechanism. In the constant height mode, the voltage and height are both held constant while the current changes to keep the junction voltage from changing. The constant current mode is usually used in STM because surface features can easily exceed a pre-defined tip-sample separation (typically 4-7 Å) and can crash the tip in a constant height mode. But the constant current mode is slow, due to more time required by the piezoelectric movements to register the height change. The time to complete a measurement for each pixel position is about 2 msec (0.5 pixels per msec) for a typical equipment, and approaches 0.1 msec (10 pixels per msec) for a top-of-line setup.

Conventional STM has a limited scanning speed because of the response time of the electric circuit and the piezoelectric component used to control the movement of the probes. The control of the motion of the tip requires an electric feedback circuit which can generate a resonance at the frequency of the order of 10 kHz. If the scanning speed is too fast large noise appears in the image in the form of a spatial oscillation. However, as long as the scan rate is below the resonant frequency, such noise usually appears in different regions in the forward scans than in the backward ones. Therefore one can devise an algorithm that exploits the difference between the forward and backward scans to eliminate the oscillatory noise in the image, thus allowing faster scans to be performed.

2 Method 2.1 Line by Line Background Removal

The intensity fluctuation in the atomic resolution images degrades the image quality and impedes the registration and image restoration method that we will apply later. Because the image intensity varies strongly from one scan line to the next, but stays nearly constant over long segments within each line, this fluctuation can be treated as a background for each scan line. Therefore, according to an aspect of the present application, the first step in processing the atomic resolution images is to remove this background in a line-by-line manner.

The forward and the backward scans are represented by $F_a \in \mathbb{R}^{m \times n}$ and $B_a \in \mathbb{R}^{m \times n}$, respectively. Consider one of the images, say $F_a$, whose i-th line is represented by $f \in \mathbb{R}^{1 \times n}$. The background is considered a slow varying function along the line. We wish to remove the background and keep the fast varying features. To achieve this, we estimate the value of the background at point x, $g_x$ by a weighted least mean-square linear fit to a segment of the line centered at x with length $S_{max}$, $$\min_{a_x, g_x} \sum_{x' = x - \frac{S_{max}}{2}}^{x + \frac{S_{max}}{2}} |f(x') - a_x(x' - x) - g_x|^2 w(x' - x) \quad (A1)$$

where $$w(x' - x) = \frac{S_{max}^2}{S_{max}^2 + 4(x' - x)^2}. \quad (A2)$$

The weight $w(x'-x)$ is to reduce the impact of noise in the data. It is a numerically efficient alternative to robust least mean-square fits. The corrected image is given by $$\tilde{f}(x) = f(x) - g_x, \quad (A3)$$

for each x. We found numerically $\Sigma_x \tilde{f}(x) = \Sigma_x |\tilde{f}(x)|$. This means that on average the corrected image intensity is close to zero. This removes most of the background and brings substantially all lines to about the same intensity (close to zero).

An additional minor improvement to the background removal process is to remove the small remnant slope at the two edges by fitting a small part of the line at two ends to a linear background with slopes of same magnitude but opposite sign (so that the two lines meet at the same height in the middle) and removing this background from the corresponding halves of the line. This step makes the intensity somewhat more uniform across the whole line.

The value of $S_{max}$ is determined by searching for the maximum correlation coefficient after image registration, a process that we will describe below.

2.2 Image Registration

The purpose of image registration is to utilize the forward and backward scan to restore a reliable map containing a single image $\phi$. Our approach for the image registration follows a 2-step process: first, the images from forward scan and backward scan, represented by $\phi_f \in \mathbb{R}^{m \times n}$ and $\phi_b \in \mathbb{R}^{m \times n}$ are aligned through global shiftings; next, a deformable inverse consistent image registration is performed to obtain local transformations under which $\phi_f$ and $\phi_b$ would have greater correlation. Since the data, although has two dimensions, is acquired through a line by line manner, the image registration methods described above are applied to each pair of lines from forward and backward scans.

For the first step, consider the i-th lines of $\phi_f$ and $\phi_b$ which are represented by $f \in \mathbb{R}^{1 \times n}$ and $b \in \mathbb{R}_{1 \times n}$ respectively. Then the objective is to find a constant c, such that f(x+c) is similar to b(x−c) which is given by the following model:

$$\min_{c \in \mathbb{Z}} \|f(x+c) - b(x-c)\|^2 \tag{1}$$

Due to the small size of the searching space for c in practice, we solve this minimization problem through heuristic search.

After the first step, two signals f and b are roughly aligned. To further increase the correlation between them, we adopt a inverse consistent deformable image registration (ICDIR) which allows localized transformation. In this problem, we aims to find deformations u, v: $\mathbb{R}^{1 \times n} \mapsto \mathbb{R}^{1 \times n}$ such that the deformed signals f(x+u) and g(x+v) are close to each other. The mathematical model for ICDIR consists three parts and reads as $$\min_{u,\tilde{u},v,\tilde{v},\sigma} F(u, v, \sigma) + \mu(\mathcal{J}(u, \tilde{u}) + \mathcal{J}(v, \tilde{v})) + \lambda R(u, \tilde{u}, v, \tilde{v}). \tag{2}$$

The first term F (u,v,σ) represents the data fidelity and is defined by $$F(u,v,\sigma) := \|f(x+u(x)) - b(x+v(x))\|^2 / 2\sigma^2 + |\Omega| \log \sigma. \tag{3}$$

where $\Omega \subset \mathbb{R}$ is the domain that f and g defined on. It is the negative log-likelihood of the residue image f(x+u(x))−b(x+v(x)) under the assumption that the pixel intensities of the residue image are independent samples drawn from a Gaussian distribution with zero-mean and variance $\sigma^2$. Minimizing F(u,v,σ) will not only enforces f(x+u(x)) close to b(x+v(x)) but also tunes the weighting parameter $1/2\sigma^2$ automatically.

The second term aims at enforcing inverse consistency for the transformations u and v. We use ũ and ṽ to approximate the inverse deformation fields $u^{-1}$ and $v^{-1}$ with respect to u and v as the inverse is hard to obtain directly. By the property of inverse, we obtain the following equations $$x = (x+u(x)) + \tilde{u}(x+u(x))$$

$$x = (x+\tilde{u}(x)) + u(x+\tilde{u}(x))$$

$$x = (x+v(x)) + \tilde{v}(x+v(x))$$

$$x = (x+\tilde{v}(x)) + v(x+\tilde{v}(x)) \tag{4}$$

Thus, in order to ensure the inverse consistence of u and v, we minimize $\mathcal{J}(u,\tilde{u})$ and $\mathcal{J}(v,\tilde{v})$ defined as $$\mathcal{J}(u,\tilde{u}) := \|u(x) + \tilde{u}(x+u(x))\|^2 + \|\tilde{u}(x) + u(x+\tilde{u}(x))\|^2 \tag{5}$$

$$\mathcal{J}(v,\tilde{v}) := \|v(x) + \tilde{v}(x+v(x))\|^2 + \|\tilde{v}(x) + v(x+\tilde{v}(x))\|^2. \tag{6}$$

The last term in the objective function is defined as $$R(u,\tilde{u},v,\tilde{v}) = \|Du\|^2 + \|D\tilde{u}\|^2 + \|Dv\|^2 + \|D\tilde{v}\|^2 \tag{7}$$

It ensures the smoothness of the transformation fields.

Next we present a numerical scheme for minimizing (7). Since it is hard to solve directly, we reformulate the above minimization problem and solve the following two minimization subproblems alternately:

$$\min_{u,v} E_{\tilde{u},\tilde{v},\sigma}(u, v) := \|Du\|^2 + \|Dv\|^2 + \lambda H(u, v, \sigma) + \mu(\mathcal{J}_{\tilde{u}}(u) + \mathcal{J}_{\tilde{v}}(v)) \tag{8}$$

and $$\min_{\tilde{u},\tilde{v}} E_{u,v}(\tilde{u}, \tilde{v}) := \|D\tilde{u}\|^2 + \|D\tilde{v}\|^2 + \mu(\mathcal{J}_u(\tilde{u}) + \mathcal{J}_v(\tilde{v})) \tag{9}$$

After obtaining the Euler-Lagrangian equations associated with the above minimization problems, we use semi-implicit discrete form of the evolution equations for numerical implementation. Moreover, the first variation of σ gives $$\sigma = \|f(x+u(x)) - b(x+v(x))\|_2 / |\Omega|^{1/2} \tag{10}$$

In one-dimensional case, the semi-implicit discrete form with fixed step sizes $\tau_u$, $\tau_{\tilde{u}}$ for the evolution equations of $u^{(k+1)}$ and $\tilde{u}^{(k+1)}$ are $$\frac{u_i^{(k+1)} - u_i^{(k)}}{\tau_u} = \partial_{ii} u^{(k+1)} - D_i(\lambda H(u^{(k)}, v^{(k)}, \sigma^{(k)}) + \mu \mathcal{J}_{\tilde{u}^{(k)}}(u^{(k)})), \tag{11}$$

$$\frac{\tilde{u}_i^{(k+1)} - \tilde{u}_i^{(k)}}{\tau_{\tilde{u}}} = \partial_{ii} \tilde{u}^{(k+1)} - \mu D_i \mathcal{J}_{u^{(k)}}(\tilde{u}^{(k)}), \tag{12}$$

where $\partial_{ii}$ and $D_i$ are the discrete form of the second and first derivatives at the position i, respectively. Similarly, we have the discrete evolution equation for $v^{(k+1)}$ and $\tilde{v}^{(k+1)}$. The numerical scheme is summarized in Algorithm 2.1.

Algorithm 2.1: Inverse Consistent Deformable Signal Registration (icDSR)

Input: Two signals f, g, and $\tau_u$, $\tau_{\tilde{u}}$, $\lambda$, $\mu > 0$, $\varepsilon = .5$, $\delta_c = 1$. Initialize $(u^{(0)}, v^{(0)}, \tilde{u}^{(0)}, \tilde{v}^{(0)}) = 0$ and set k = 0.
while $\delta_c \geq \varepsilon$ do
  1. repeat
    (a) Calculate $(u^{(k+1)}, \tilde{u}^{(k+1)})$ by (11) and (12).
    (b) Calculate $(v^{(k+1)}, \tilde{v}^{(k+1)})$ by (11) and (12), where $(u^{(k+1)}, \tilde{u}^{(k+1)})$ are replaced by $(v^{(k+1)}, \tilde{v}^{(k+1)})$.
    (c) Update $\sigma^{(k+1)}$ by (10).
    (d) k ← k + 1
  2. until convergence
  3. return $(u, v, \tilde{u}, \tilde{v})^\mu$
  4. Set $(u, v, \tilde{u}, \tilde{v}) \leftarrow (u, v, \tilde{u}, \tilde{v})^\mu$ and $\mu \leftarrow 2\mu$.
  5. Compute $\bar{u} := \tilde{v} + u(x + \tilde{v})$, $\bar{v} := v + \tilde{u}(x + v)$, and
  $\delta_c = \max_x \{|\bar{u} + \tilde{v}(x + \bar{u})|, |\bar{v} + \tilde{u}(x + \bar{v})|\}$
end while For the above algorithm, the inner loop will be terminated with fixed μ when the mean of the cross correlation CC(f(x+ū),b) and CC(b(x+v̄),f) converges. As step 3 and 4 shows, the returned value $(u,v,\tilde{u},\tilde{v})^\mu$ from the inner loop will be set as the initialized value for each outer loop. Meanwhile, the parameter μ is doubled in each outer loop to safeguard smaller $\delta_c$. When $\delta_c$ is lower than ε, the outer loop will be terminated.

Although the images are two dimensional, the data is acquired in a line by line manner Therefore the image registration method is applied separately to each line of the forward and the backward scans, $F_a$ and $B_a$. The registration procedure consists of a line shift, in which each pair of corresponding lines from $F_a$ and $B_a$ are adjusted by a line shift to minimize their difference, followed by a deformable inverse consistant image registration, which is performed to obtain local transformations under which $F_a$ and $B_a$ have the greatest correlation.

The line shift is calculated for the i-th lines of $F_a$ and $B_a$, which are represented by $f \in R^{1 \times n}$ and $b \in R^{1 \times n}$ respectively, as a minimization problem. The objective is to find a constant c, such that f(x+c) is as close to b(x−c) as possible. In Ref. Conductivity, the condition is expressed as the following model, $$\min_{c \in Z} \|f(x+c) - b(x-c)\|^2 \quad (13)$$

The small searching space for c in practice allows one to solve this minimization through a heuristic search. However, this method is susceptible to noise, especially for atomic resolution data in which presence of noise signal may have the same magnitude as images of atoms. Therefore we need a more robust approach to image registration.

The improved approach is to treat the pair of data sets $F_a$ and $B_a$ as linearly correlated data, and find the constant c such that the regression coefficient is maximized, $$\max_{c \in Z} \frac{\sum [f(x+c) - f_{avg}][b(x-c) - b_{avg}]}{\sqrt{Pf(x+c) - f_{avg}P^2 Pb(x-c) - b_{avg}P^2}}, \quad (14)$$

where $f_{avg} = (1/N)\Sigma_x f(x+c)$ and $b_{avg} = (1/N)\Sigma_x b(x-c)$ and N is the number of points in each line.

However, even with the aligned data, the spurious oscillations still exist. In fact, in the best case scenario, a simple average would only reduce the spurious oscillations by about half. A better algorithm is needed to eliminate these oscillations, as we will present next.

2.3 Signal Restoration

Figure 14:
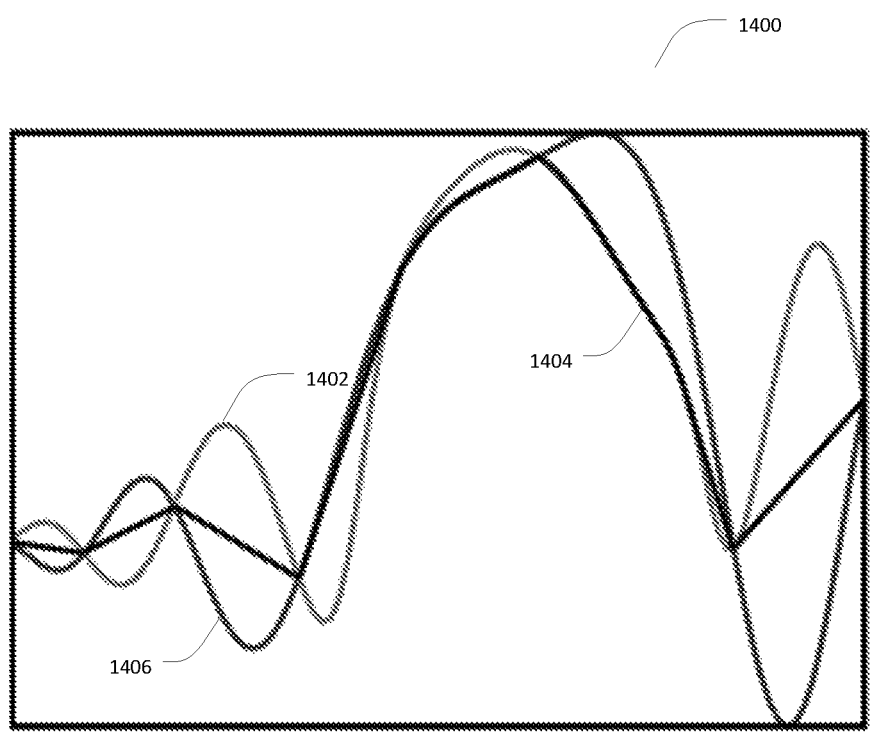
FIG. 14 is a data plot showing results of the rubber band method for processing scan data, according to an embodiment.

Restoring the true data S from the aligned forward scan $F_a$ and backward scan $B_a$ is desired. According to some embodiments, we may use a "rubber band" model. As shown in the data plot 1400 in FIG. 14, a "rubber band" 1404 is inserted between the curves 1402, 1406 of the two scanned signals and is pulled tight. The "rubber band" curve 1404 is the final image that closest represents the true signal. Let s denotes one row of S while f and s represent the corresponding rows of $F_a$ and $B_a$. The associated model for this pair of lines is given by:

$$\min_s \|Ds\|_1 \quad (15),$$
$$\text{s.t.} \quad s(i) \leq \max\{f(i), b(i)\},$$
$$s(i) \geq \min\{f(i), b(i)\},$$
where $i = 1, \ldots, n$.

or by:

$$\min_s \sum_{p=2}^n |s(p) - s(p-1)|^2 \quad (16).$$
$$\text{s.t.} \quad s(p) \leq \max\{f(p), b(p)\},$$
$$s(p) \geq \min\{f(p), b(p)\},$$
where $p = 1, \ldots, n$.

Solve this optimization problem directly may be hard due to its constraints, an alternative way may be to provide an approximate solution to this problem. The main idea is to repeatedly smooth the candidate signal by filtering while maintaining its value bounded by forward and backward scans until it converges. The convergence is in the sense that the candidate signal is not altered significantly by further filtering.

Note that the existence of the solution is guaranteed as the average of the forward and backward scans satisfies the constraints and we may use it as the initial candidate signal. For the filtering process, we may perform convolutions between the candidate signal with generated Gaussian kernels. To speed up the process, we may apply Gaussian kernels with different sizes in different spatial positions instead of a fixed size. The size of kernel for a given position is started with a small number (e.g. 3), if after convolution with a Gaussian kernel of the same size the outcome still satisfies the constraints we increase the size of kernel by 2 and perform the checking again. If with a size of 2l+1, the outcome of convolution falls outside the constraints, we use the output of the convolution with kernel of 2l−1 as the value for this spatial position. The algorithm is outlined in ALG. 2.2.

---

Algorithm 2.2: The Constrained Adaptive
and Iterative Filtering algorithm for
approximately solving problem (2.2)

Input: Aligned forward and backward scan $F_a$ and $B_a$ with their dimensions m, n, the tolerance tol and the maximum iteration number N.
For r = 1, ... , m do
    1: Set f = $F_a$(r, : ), b = $B_a$(r, : ) and $s_0$ = ½ (f + b).
    2: Calculate $s_{max}$ = max{f, b} and $s_{min}$ = min{f, b}.
    3: For i = 1, ... , N do:
        (a) For p = 1, ... , n do:
            i. Set l = 1, y = $S_i$(p).
            ii. Generate a discrete Gaussian kernel h of length 2l + 1.
            iii. Compute c = $s_i$(p − l: p + l) * h(1: 2k + 1).
            iv. If $s_{min}$(p) ≤ c ≤ $s_{max}$(p): set l = l + 1, y = c and go to 3(a)ii;
        else set $s_i$(p) = y.
        (b) Compute d = $\| s_i - s_{i-1} \|_2$, terminate the loop 3 if d < tol.
    4: Set the r-th row of the output data S(r, : ) = $s_i$.
end for
Output: S as the restored data from $F_a$ and $B_a$. In ALG. 2.2, the notation F(r, : ) represents the r-th row of the 2D matrix F and the operator min{·,·} and max{·,·} generate vectors of element-wise minimum or maximum value of the two input vectors respectively. The operator * in 3(a)iii of ALG. 2.2 represents the discrete convolution operation.

---

2.4 Construction of the Ranking Map

According to an aspect of the present application, the first three post-processing steps described above on atomic resolution fast scan data may yield images that clearly show surface lattice structure. However, such images, like most atomic resolution STM images, contain both the information of atomic positions as well as the topography of the surface. The latter tends to obstruct the visibility of atomic positions. If the topography information is discarded, then one can obtain a higher quality image containing only atomic positions. In this section we will describe such an algorithm.

The first part of this algorithm is to remove all large scale topography information while retaining the local height information that is needed to distinguish the atoms. To achieve this, we denote by $\Omega_{x,y}$ the square consisting of n×n pixels centered at (x,y) and define a ranking function R(x,y)

for S(x,y) on $\Omega_{x,y}$ as follows: If S(x,y) is the $i^{th}$ smallest one among all S(x',y') for (x',y')$\in\Omega_{x,y}$, define R(x,y)=: i−1. Then, we replace S(x,y) by R(x,y). Clearly, we have $$R(x,y) = \begin{cases} 0, & \text{if } S(x,y) = \min_{(x',y')\in\Omega_{x,y}} S(x',y'), \\ n^2-1, & \text{if } S(x,y) = \max_{(x',y')\in\Omega_{x,y}} S(x',y'), \end{cases} \quad (17)$$

This ensures that the entire map is ranged between 0 and $n^2$−1. The best value for n is the number of pixels that covers more than 1-2 atomic distances.

The ranking map obtained this way is a ragged image. We apply a 2D median filter to obtain a smoothed image.

The method of using the ranking map for feature enhancement can be viewed as the reverse of ranking based smoothing techniques such as median filtering. However the ranking map algorithm presented here is unique in that it does not merely use the ranking to help determine the image intensity as in the median filtering method. In the ranking map method, the final image intensity is the ranking itself, and the original image is discarded once the ranking map is constructed.

3 Experimental Results

Figure 2A:
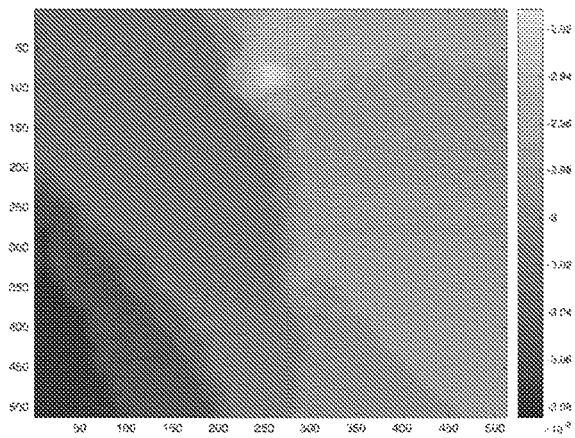
FIG. 2a is a graph showing an exemplary scanning tunneling microscope (STM) image with lines captured during forward scans.
Figure 2B:
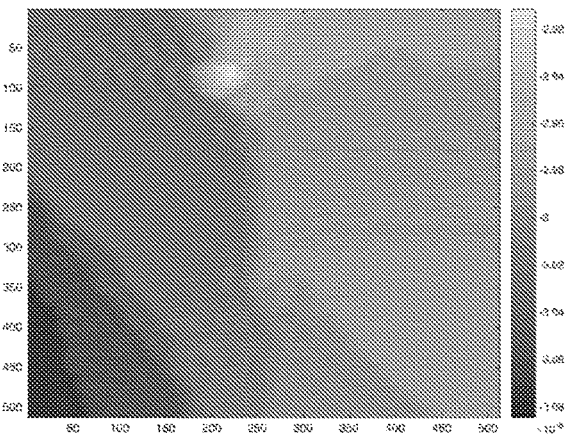
FIG. 2b is a graph showing an exemplary STM image with lines captured during backward scans.
Figure 3A:
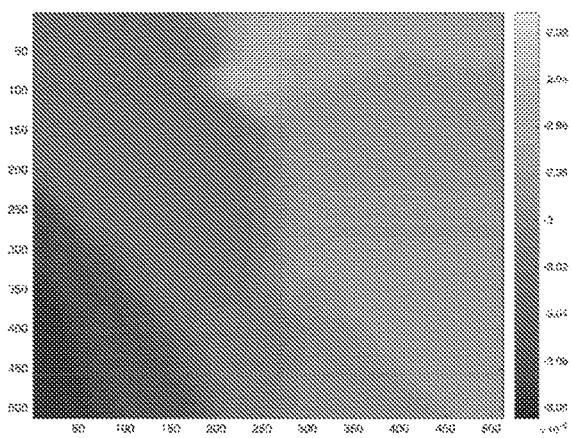
FIG. 3a is a graph showing an average of the forward and backward scans in the example in FIGS. 2a and 2b.
Figure 3B:
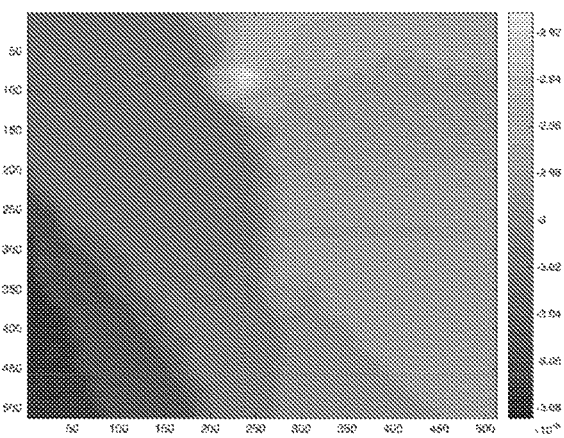
FIG. 3b is a graph showing an average of an aligned forward and aligned backward scans based on the example in FIGS. 2a and 2b, according to an embodiment.
Figure 4:
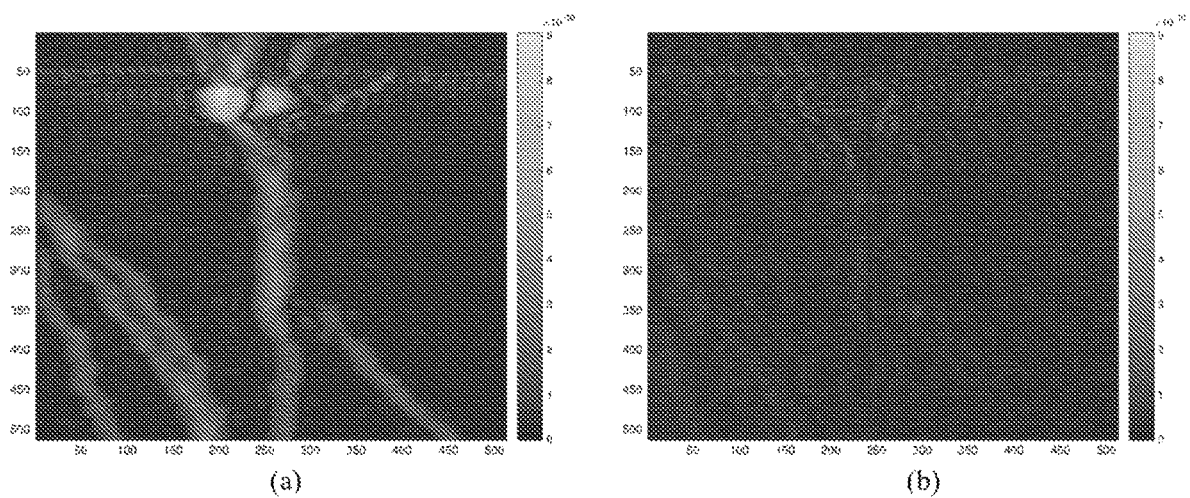
FIG. 4a is a graph showing the difference between the forward and backward scans in the example in FIGS. 2a and 2b.
FIG. 4b is a graph showing the difference between aligned forward scans and aligned backward scans based on the example in FIGS. 2a and 2b, according to an embodiment.

To establish the effectiveness of our algorithm, we tested it on a set of STM data consists of forward and backwards scans with fast speed. Several large data sets contain STM scans of a clean copper (111) surface at room temperature (299 K) using a tungsten tip under conventional scan speed (about 2 msec per data point) as well as fast scan speed ranging from 0.2 msec per data point to 0.1 msec per data point (effective scanning speed 1.56 μm/sec for scan area 80 nm×80 nm) with multiple scans for the same region on the sample surface. The original scans are shown in FIG. 2 and the results of signal registration are shown in FIG. 3 and FIG. 4. From FIG. 2 we can see that both original forward scan and backward scan suffers from significant noises however the patterns of noise are different which makes the enhancements possible. In FIG. 3 we compare the average of the original forward and backward scans with the average of the aligned forward and backward scans, from where we can observe that the averaged image from original scans has fuzzy edges and even worse than the original ones while that from aligned ones shows noticeable improvements. On the other hand, we compare the absolute differences between the forward and backward scans from original data against the aligned ones in FIG. 4 and it is clear that the gap between the two scans have been significantly reduced.

Figure 5:
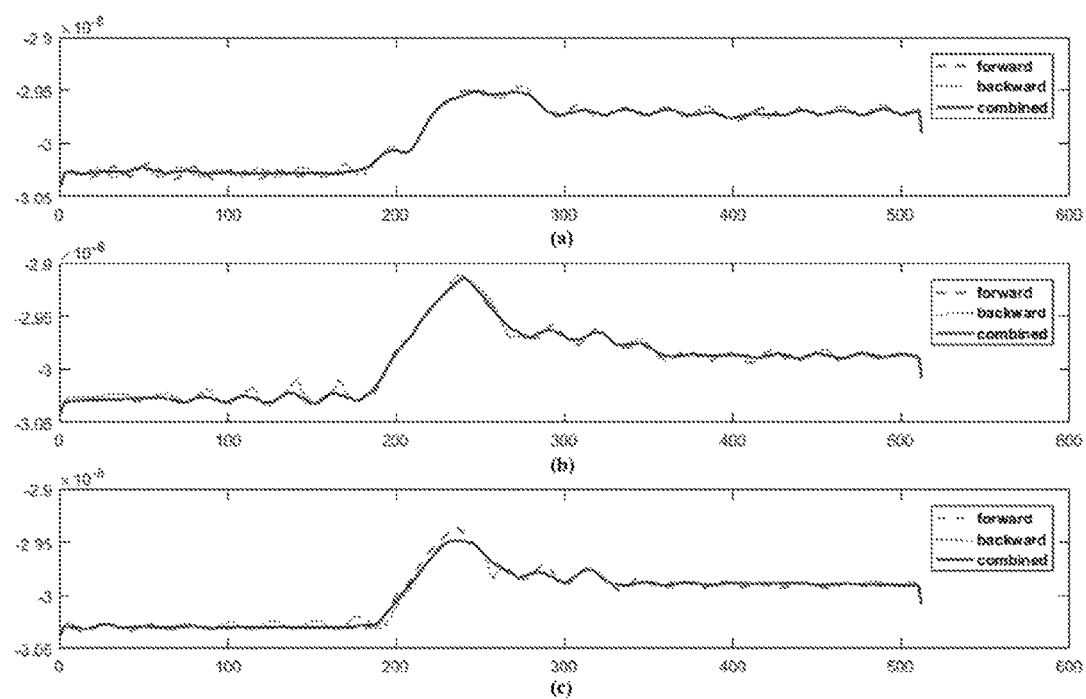
FIGS. 5a-c are data plots showing line traces along rows 46, 80 and 100, respectively, of the exemplary STM image in FIGS. 2a and 2b.
Figure 6A:
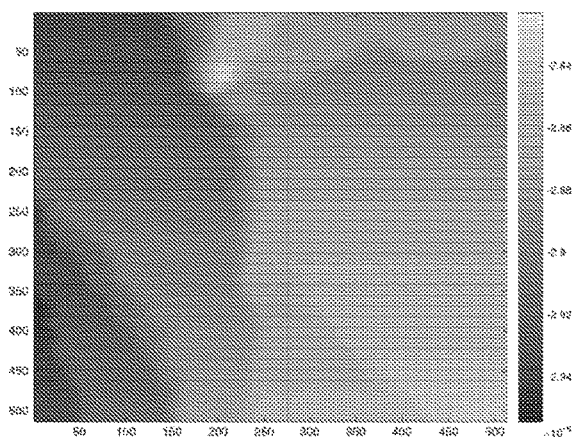
FIG. 6a is a graph showing an exemplary STM image with lines captured during a slow scan speed.
Figure 6B:
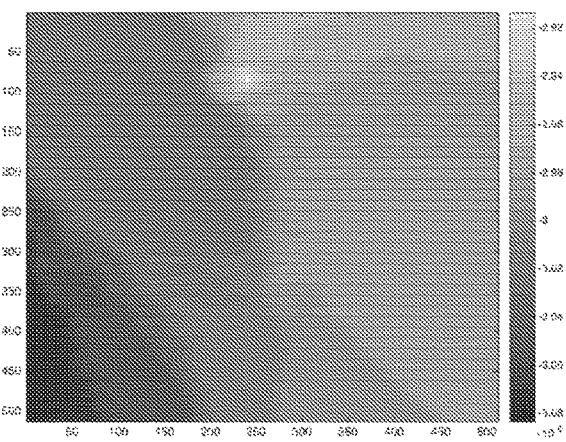
FIG. 6b is a graph showing an exemplary STM image of the same sample surface with the example in FIG. 6a, with lines captured during a fast scan speed and processed with the data processing method according to an embodiment.

We demonstrate the proposed signal restoration algorithm in FIG. 5 in which we plot the results on three selected rows of the data. We compare our final result with a set of STM scan with slow speed of the same surface in FIG. 6.

Figure 15A:
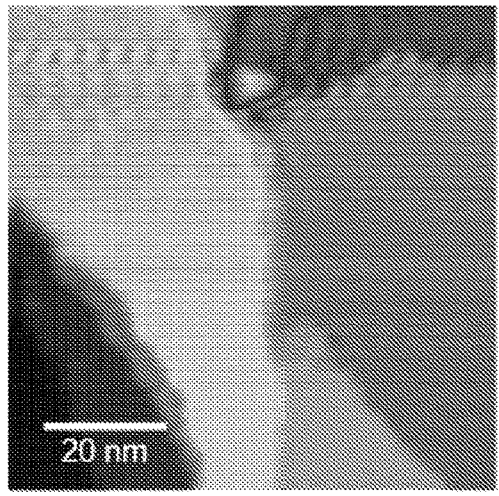
FIG. 15a is a graph showing topography data from forward scan, according to an embodiment.
Figure 15B:
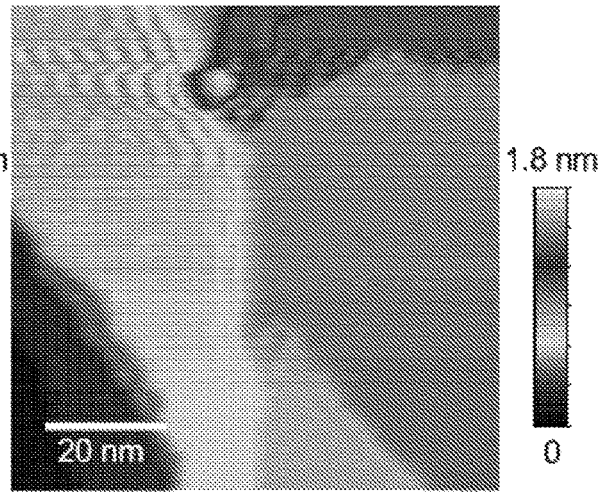
FIG. 15b is a graph showing topography data from backward scan, according to an embodiment.
Figure 15C:
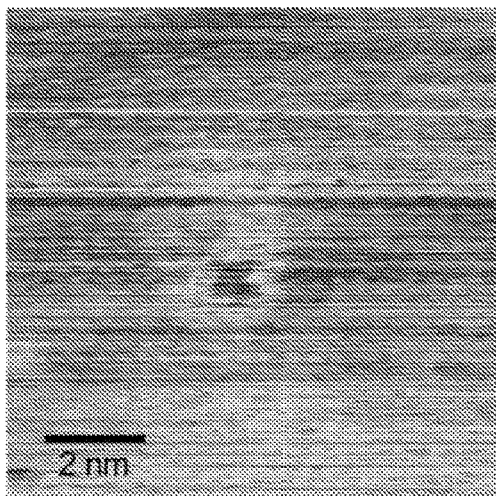
FIG. 15c is a graph showing atomic resolution raw data from forward scan, according to an embodiment.
Figure 15D:
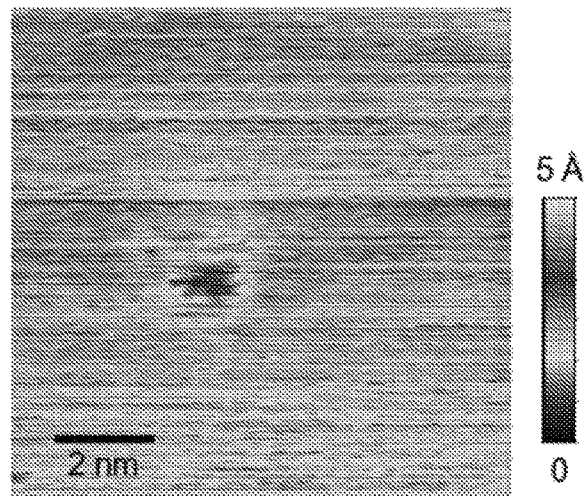
FIG. 15d is a graph showing atomic resolution raw data from backward scan, according to an embodiment.
Figure 16A:
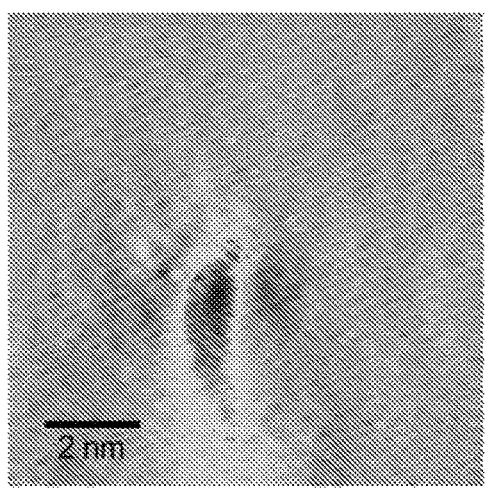
FIG. 16a is a graph showing processed atomic resolution image of the sample from the fast scan data in FIG. 15c and FIG. 15d, after background removal, registration and image restoration steps, according to an embodiment.
Figure 16B:
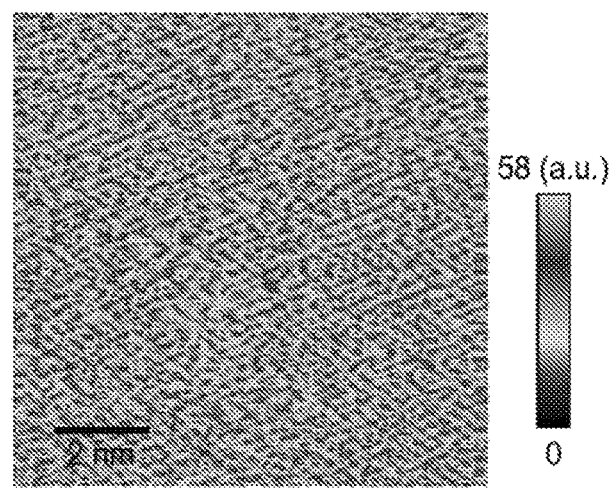
FIG. 16b is a graph showing a ranking map of the post-processed image in FIG. 16a, at the final atomic resolution image, according to an embodiment.

For the atomic resolution fast scan data, the raw image in FIG. 15*c* and FIG. 15*d* is overwhelmed by noise and has no observable atomic structure. The final processed image, FIG. 16*b*, however, displays clearly the surface lattice structure. One can even see the significant lattice strain and disorder due to the proximity of a large defect.

4 Example: Conductivity Map from Scanning Tunneling Potentiometry

In this example, we present a method for extracting two-dimensional (2D) conductivity profiles from large electrochemical potential datasets acquired by Scanning Tunneling Potentiometry (STP) of a 2D conductor. The method consists of a data preprocessing procedure to reduce/eliminate noise and a numerical conductivity reconstruction. The preprocessing procedure employs an inverse consistent image registration method to align the forward and backward scans of the same line for each image line followed by a total variation (TV) based image restoration method to obtain a (nearly) noise-free potential from the aligned scans. The preprocessed potential is then used for numerical conductivity reconstruction, based on a TV model solved by accelerated Alternating Direction Method of Multiplier (A-ADMM). The method is demonstrated on a measurement of the grain boundary of a monolayer graphene, yielding a nearly 10 to 1 ratio for the grain boundary resistivity over bulk resistivity.

4.1 Introduction

Progress in materials science and electronic devices is driven by scaling to smaller and lower dimensions. When the size of a sample is smaller than the electron mean-free-path, for example, its conductivity can be dominated by the presence and character of interfaces such as grain boundaries. Interface or grain boundary scattering can be even more important in reduced dimensions. Grain boundaries in polycrystalline graphene have been shown to strongly impact the electronic properties of the material. In monolayer MoS_2, local conductivity at a grain boundary exhibits anisotropy along and across the boundary, with different anisotropies for different types of grain boundaries.

Conventional transport measurement technique measures the macroscopic current-voltage relationship for a sample and extracts the conductivity. The estimate of the grain boundary conductivity relies on the estimate of the grain boundary density (grain size) and the model of the resistor network formed by the grain boundaries. Other extraneous resistance sources such as phonon and impurity scattering must also be carefully excluded. Even in the best experiments, this method can only yield an average estimate of the grain boundary conductivity.

Application of STM to materials research has been most fruitful when it is combined with measurements of transport properties. It is a particularly useful tool for studying 2D materials such as graphene and topological insulators. In contrast to the atomic resolution images on topography measurements using STM, atomic resolution for transport measurements is a far greater challenge. Yet many of unresolved problems in transport properties of graphene and other 2D electronic materials are related to spatial inhomogeneity in these materials on the nanometer scale. Therefore, a capability of real-space, atomic resolution transport measurements would provide a powerful tool for overcoming these scientific challenges.

Scanning tunneling potentiometry (STP) has been recently employed to yield two-dimensional maps of the electrochemical potential on the surface of a material while an electric current is flowing along the surface. The obvious approach using this technique for conductivity measurement of a grain boundary is to perform a scan along a line perpendicular to the boundary, and extract the local conductivity using the potential profile along the line. This method produces excellent result if the local current direction is exactly perpendicular to the grain boundary. One way to ensure that is to make the measurement on a nanowire etched from a larger sample containing grain boundaries. In general, however, this is not a feasible approach.

Here we present an algorithm for extracting a conductivity profile from large amount of data produced by STP. Typical experimental data is like the two panels shown in FIG. 1 for a sample of a grain boundary of graphene on a SiO_2/Si substrate, with the forward scan in (a) and backward scan in (b). The preparation of the sample and the measurement details are the same as described in a previous work. The noise in the potentiometry map is clearly visible. We solve a set of underdetermined partial differential conductivity equations using as input the noisy 2D potential profile obtained from such maps. The linear system contains gradients thus is unusually sensitive to the noise in the data. Therefore we devise a robust and reliable noise removal procedure before conductivity is extracted. The method presented here covers both the noise removal procedure and the numerical conductivity reconstruction. It exploits the data redundancy in the forward and backward scans of the same sample to reduce/eliminate the noise. This work represents a significant advance from a previous work that extracted the grain boundary resistance of graphene. Compared to the previous work, the current method is more robust, ensures convergence, and greatly reduces the effect of noise. We introduce our algorithms for extracting conductivity profile and data preprocessing in section 2 and demonstrate the method on a set of graphene grain boundary data in section 3.

4.2 Method 4.2.1 Extraction of Conductivity 4.2.1.1 General Equations

In scanning tunneling potentiometry (STP), the conductivity can be solved from the electrochemical potential map by solving a Poisson-like equation, which is derived from the current continuity condition $\nabla \cdot J=0$ away from the current source. Using Ohm's law for the current density, $J=-\sigma \cdot \nabla \phi$ where $\sigma=\sigma(x,y)$ is the conductivity tensor at location $(x,y)$ and $\phi$ is the electrochemical potential, we find, $$\nabla \cdot (\sigma \cdot \nabla \phi) = 0. \quad (B1)$$

in which $\nabla \phi$ provides the known coefficients. Because $\sigma$ is a tensor, the above partial differential equation provides only less than half number of equations needed to determine $\sigma$. An additional set of equations is provided by the requirement that there are no current loops in the system, $\nabla \times J=0$, which translates to, $$\nabla \times (\sigma \cdot \nabla \phi) = 0. \quad (B2)$$

Writing the tensor $\sigma$ into a vector form, $\sigma=(\sigma_1(x_1,y_1), \sigma_1(x_2,y_2), \ldots, \sigma_2(x_1,y_1), \sigma_2(x_2,y_2), \ldots)$, we can combine the two sets of equations as, $$A\sigma = 0. \quad (B3)$$

The boundary conditions are not usually known because the current probes are placed far away from the scanned region to ensure a relatively uniform current density in the scanned region. Due to the presence of inhomogeneity, the local current direction is unknown, therefore the boundary conditions cannot be determined. As a result, the system of equations is underdetermined.

A straightforward way to solve problem (B3) approximately would be using the gradient descent method to solve the associated minimization problem $$\min_{\|\sigma\|^2=1} \|A\sigma\|^2 \quad (B4)$$

with the following scheme, $$\sigma^{(k+1)} = \sigma^{(k)} + p_k(A^T A \sigma - \|A\sigma\|^2 \sigma), \quad (B5)$$

where the stepsize $p_k$ is chosen such that the global error of the linear system is minimized. However, the gradient descent method has low rate of convergence $O(1/N)$ in terms of the objective function value. Furthermore, this problem (B4) is ill-posed so we propose to introduce regularization terms into the model with appropriate assumptions.

4.2.1.2 Total Variation (TV) Method

To improve the accuracy of the solution a and to reduce the computation effort, we apply the following total variation (TV) regularized linear inversion model, $$\min_{\|\sigma\|=1} \int_\Omega \{|\nabla \cdot (\sigma \cdot \nabla \phi)|^2 + |\nabla \times (\sigma \cdot \nabla \phi)|^2 + \lambda |\nabla \sigma|\} dx dy, \quad (B6)$$

where the first two terms enforce a to be approximate solutions of Eq. (B1) and (B2), and the last term is a TV regularization, which is an edge (or discontinuity) preserving smoothing. To avoid the trivial solution $\sigma=0$, the constraint $\|\sigma\|=1$ is imposed to the model such that the solution of the constraint problem always stays on the unit sphere. The discrete form reads as, $$\min_{\|\sigma\|=1} \|A\sigma\|^2 + \lambda(\|D\sigma_1\|_{2,1} + \|D\sigma_2\|_{2,1}). \quad (B7)$$

Here $\sigma=[\sigma_1 \ \sigma_2]^T$ and $\|D\sigma\|_{2,1}$ denotes the discrete form of the TV seminorm of u defined as $\Sigma_i \sqrt{(\partial_x u_i)^2 + (\partial_y u_i)^2}$ where $\partial_x$ and $\partial_y$ represent finite difference operator along x and y direction of the 2D grid at pixel i respectively.

The minimization problem (B7) can be solved through the Alternating Direction Method of Multiplier (ADMM) by introducing auxiliary variables $w_1=D\sigma_1$ and $w_2=D\sigma_2$. Then the original problem is transformed to the following constraint minimization problem:

$$\min_{\|\sigma\|=1, w_1, w_2} \|A\sigma\|^2 + \lambda(\|w_1\|_{2,1} + \|w_2\|_{2,1}) \quad (B8)$$
$$\text{s.t.} \quad w_1 = D\sigma_1,$$
$$w_2 = D\sigma_2.$$

Then the augmented Lagrangian for (B8) is:

$$\mathcal{L}(\sigma, y_1, w_1, y_2, w_2) = \quad (B9)$$
$$\|A\sigma\|^2 + \lambda \sum_{i=1,2} \left( \|w_i\|_{2,1} - \langle y_i, w_i - D\sigma_i \rangle + \frac{\eta}{2} \|w_i - D\sigma_i\|^2 \right).$$

The ADMM solves $(\sigma, w_1, w_2, y_1, y_2)$ iteratively and alternatively by minimizing (for $\sigma$ and w) or maximizing (for y) the Lagrangian with respect to one variable while fixing the others.

To accelerate the convergence of ADMM, an accelerated linearized and preconditioned ADMM (ALP-ADMM) was proposed. Different from the classical ADMM, ALP-ADMM introduce sequences $\sigma^{md}$ and $\sigma^{ag}$ for the acceleration purpose inspired by the Nesterov accelerating scheme. In addition, when solving $\sigma$ sub-problem and w sub-problem, the ALP-ADMM linearizes $\|A\sigma\|$ and $$\frac{\eta}{2}$$

$\|w_i - D\sigma_i\|^2$ at t-th iterate $\sigma_t^{md}$ to simplify the calculation of the sub-problem. It is proven that ALP-ADMM has the rate of convergence of $O(1/N^2)$ with regard to the smooth term (the first term in this case) while the standard ADMM only offers the rate of $O(1/N)$. The details of the algorithm is given by Algorithm 4.1.

The $\sigma$ sub-problem (B14) can be solved exactly and then maps onto the unit sphere by normalization:

$$\hat{\sigma} = \sigma_t - \frac{1}{\eta_t}\left(A^T A\sigma_t^{md} + \left[\hat{W}_t^1 \hat{W}_t^2\right]^T\right) \tag{B10}$$

$$\sigma_{t+1} = \hat{\sigma}/\|\hat{\sigma}\| \tag{B11}$$

where $\hat{W}_t^i = D^T((y_i)_t + (w_i)_t - D(\sigma_i)t)$ for i=1,2.

The w sub-problem (B16) can be solved exactly using shrinkage operator:

$$(w_i)_{t+1} = \mathcal{S}\left(w_i - D(\sigma_i)_{t+1} - \frac{(y_i)_t}{\tau_t}, \frac{\lambda}{\tau_t}\right) \tag{B12}$$

where $S(x,\lambda) := \text{sign}(x) \cdot \{\max|x| - \lambda, 0\}$.

---

Algorithm 4.1: The ALP-ADMM algorithm for solving problem (B7)

---

Choose $\sigma_1$ with $\|\sigma_1\|_2 = 1$ and set $w_1 = D\sigma_1$, $\sigma_1^{ag} = \sigma_1$, $w_1^{ag} = w_1$ and $y_1^{ag} = 0$.
for t = 1, ..., N − 1 do [1] Update variables $\sigma$:

$$\sigma_t^{md} = (1 - \alpha_t)\sigma_t^{ag} + \alpha_t\sigma_t \tag{B13}$$

$$\sigma_{t+1} = \text{argmin}_{\|\sigma\|_2=1} \langle A^T A\sigma_t^{md}, \sigma\rangle + \frac{\eta_t}{2}\|\sigma - \sigma_t^{md}\|^2 + \langle(y_1)_t, D\sigma_1\rangle + \tag{B14}$$

$$\langle(w_1)_t - D(\sigma_1)_t^{md}, D\sigma_1\rangle + \langle(y_2)_t, D\sigma_2\rangle + \langle(w_2)_t - D(\sigma_2)_t^{md}, D\sigma_2\rangle$$

$$\sigma_{t+1}^{ag} = (1 - \alpha_t)\sigma_t^{ag} + \alpha_t\sigma_{t+1} \tag{B15}$$

Update auxiliary variables $w_i$ for i = 1,2:

$$(w_i)_{t+1} = \text{argmin}_{w_i} \lambda\|w_i\|_{2,1} - \langle(y_i)_t, w_i\rangle + \frac{\tau_t}{2}\|w_i - D(\sigma_i)_{t+1}\|^2 \tag{B16}$$

Update multiplier $y_i$ for i = 1,2:

$$(y_i)_{t+1} = (y_i)_t - \rho_t((w_i)_{t+1} - D(\sigma_i)_{t+1}) \tag{B17}$$

end for
output $\sigma = \sigma_N^{ag}$.

---

4.2.2 Preprocessing

Preprocessing is used in our proposed method of extracting conductivity profile. Firstly, to obtain a reliable φ with the forward and backward scans of the same line, we need to perform image registration on them as they tend to not aligned well in practice. Secondly, the model (B8) involves the first and second order derivatives of φ, hence the smoothness of φ should be ensured in advance of the image restoration process. The preprocessing of the data is divided into two key steps: 1. image registration of forward ($\phi_f$) and backward scan ($\phi_b$); 2. restore the combined data from the processed forward and backward scans ($\phi_c$) by TV based denoising.

4.2.2.1 Image Registration

Image registration to align the forward and backward scans uses the technique described in section 2.1

4.2.2.2 Image Restoration

Once the forward and backward scans are aligned through the proposed image registration method, we combine them to obtain more reliable $\phi_c$ by taking the average of the two pre-processed potentials: $\phi_c=(\phi_f+\phi_b)/2$. However, this combined potential $\phi_c$ may be noisy. A noisy $\phi_c$ can significantly degrade the quality of the reconstruction result due to the fact that operator A in Eq. (B7) involves the first and second order derivatives of $\phi_c$. To construct operator A and obtain a desired conductivity map, additional noise reduction is desired. To reduce the noise, a second step of data preprocessing is performed to restored a smoothed potential $\phi$ from the combined data $\phi_c$.

---

Algorithm 4.2: The ADMM algorithm for solving problem (B28)

Choose $\phi_1 = 0$, $w_1 = 0$, $y_1 = 1$.
Spatially Resolved Mapping of Electrical Conductivity across
Individual Domain (Grain) Boundaries in Graphene
for $t = 1, \ldots, N - 1$
do 1: Update variable $\phi$:

$$\phi_{t+1} = \operatorname{argmin}_\phi \frac{1}{2}\|\phi - \phi_c\|^2 + \langle y_t, D\phi\rangle + \frac{\rho}{2}\|w - D\phi\|^2 \quad (B25)$$

2: Update w $$w_{t+1} = \operatorname{argmin}_w \lambda\|w\|_{2,1} - \langle y_t, w\rangle + \frac{\rho}{2}\|w - D\phi_{t+1}\|^2 \quad (B26)$$

3: Update multiplier y:
$y_{t+1} = y_t - \rho(w_{t+1} - D\phi_{t+1})$
end for
output $\sigma = \sigma_N^{ag}$.

---

It has been known that TV based smoothing preserves edges while smoothes images. Hence we employ a TV based image restoration model, known as ROF model to restore the noisy images in Step 4. Let $\phi_c$ and $\phi$ be the observed noisy image and restored image respectively. The ROF model reads as $$\min_\phi \frac{1}{2}\int_\Omega \|\phi - \phi_c\|^2 + \lambda \int_\Omega |\nabla\phi|, \quad (B28)$$

where $\lambda>0$ is a parameter. The first term in the model serves as the data fidelity term while the second term is the total variation of image $\phi$. In practice, image with redundant details (e.g. noisy image) has high total variation. Thus, by minimizing the total variation of a image while restricting it not diverse too far from its original form, the undesirable details (e.g. noise) are then removed.

Numerous algorithms were introduced to solve this problem. To keep a consistent approach in this work we adopt the ADMM algorithm for this task. It is sufficient for our purpose because the first term in Eq. (B28) is strongly convex and smooth so both accelerated and classic ADMM have the same convergence rate.

4.3 Validation with Experimental Data

Figure 7A:
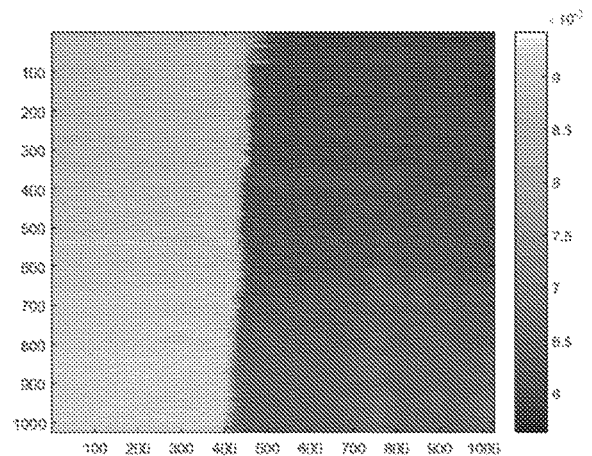
FIG. 7a is a graph showing an exemplary scanning tunneling potentiometry (STP) image with lines captured during forward scans.
Figure 7B:
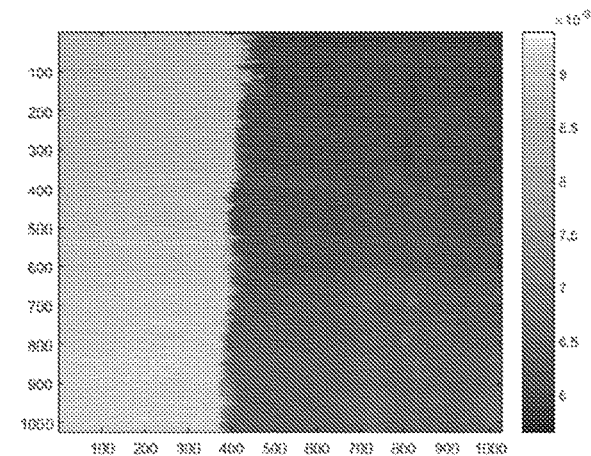
FIG. 7b is a graph showing an exemplary STP image with lines captured during backward scans.
Figure 8A:
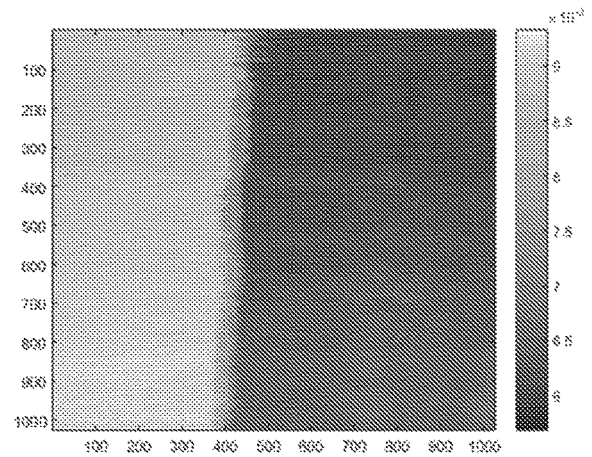
FIG. 8a is a graph showing an average of the forward and backward scans in the example STP images in FIGS. 7a and 7b.
Figure 8B:
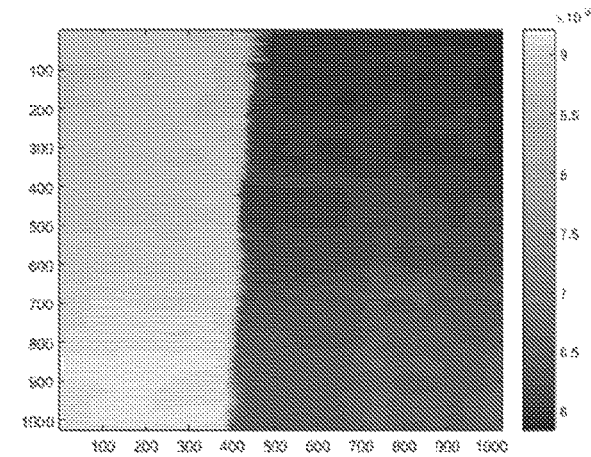
FIG. 8b is a graph showing an average of an aligned forward and aligned backward scans based on the example STP images in FIGS. 7a and 7b, according to an embodiment.
Figure 9A:
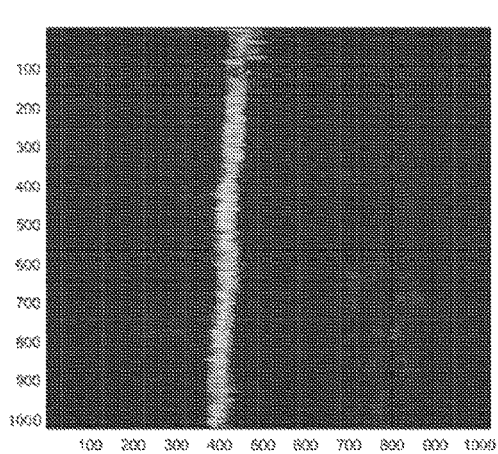
FIG. 9a is a graph showing the difference between the forward and backward scans in the example in FIGS. 7a and 7b.
Figure 9B:
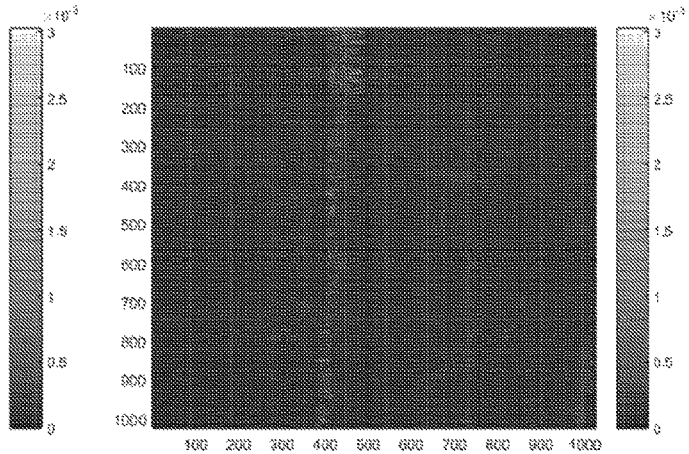
FIG. 9b is a graph showing the difference between aligned forward scans and aligned backward scans based on the example STP image in FIGS. 7a and 7b, according to an embodiment.

The proposed algorithms are validated on a set of STP data of graphene grain boundary on $SiO_2$/Si substrate as shown in FIG. 7. The improvement of preprocessing over the raw data is demonstrated in FIGS. 8 and 9. In FIG. 8, we compare the average potential obtained from the raw data (panel a) against that obtained from the preprocessed data (panel b). The former clearly shows more noise and has a fuzzy edge at the grain boundary. The preprocessed data yields a smoother potential with a sharper grain boundary. FIG. 9 shows the difference between the forward and backward scans for the raw data (panel a) and the preprocessed data (panel b). The difference is significantly reduced by the preprocessing procedure.

Figure 10:
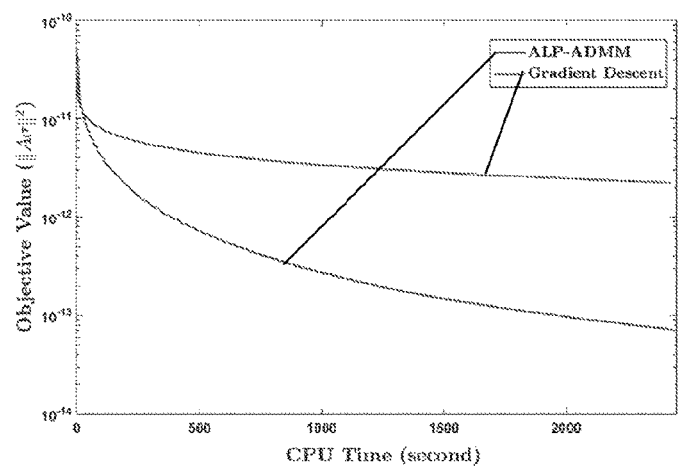
FIG. 10 is a data plot showing objective function value versus the CPU time between the algorism ALP-ADMM and the gradient descent method, respectively, according to an embodiment.

The decrease of the objective function value of the proposed reconstruction algorithm (Algorithm. 4.1) is compared to the gradient descent algorithm on the same preprocessed data in FIG. 10. Since the gradient descent algorithm does not solve model (B8) directly but solves model (B4), for comparison we only use the fitting term $\|A\sigma\|^2$. The proposed algorithm clearly out-performs the gradient descent algorithm with a better asymptotic rate of convergence.

Figure 11A:
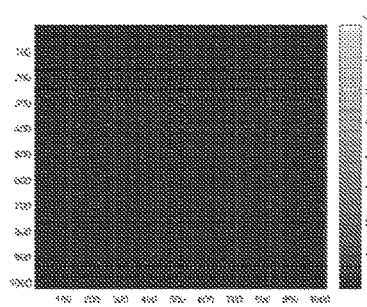
FIG. 11a is a graph showing a map of extracted conductivity value for $\sigma_x$ processed based on the forward scans in the example in FIG. 7a according to an embodiment.
Figure 11B:
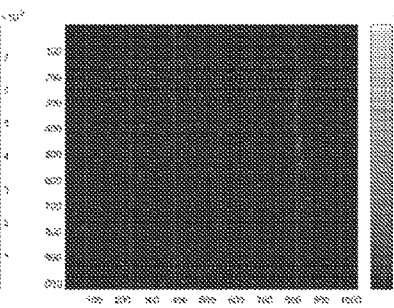
FIG. 11b is a graph showing a map of extracted conductivity value for $\sigma_x$ processed based on the backward scans in the example in FIG. 7b according to an embodiment.
Figure 11C:
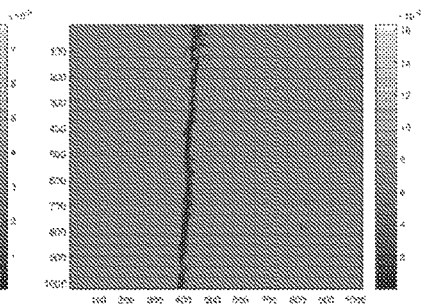
FIG. 11c is a graph showing a map of preprocessed data based on the extracted conductivity values in the examples in FIGS. 11a and 11b according to an embodiment.
Figure 12A:
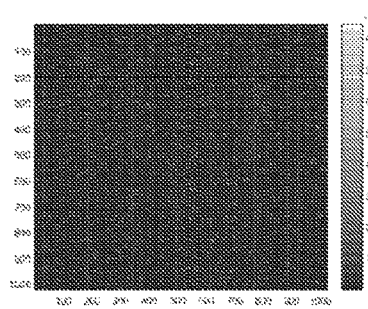
FIG. 12a is a graph showing a map of extracted conductivity value for $\sigma_y$ processed based on the forward scans in the example in FIG. 7a according to an embodiment.
Figure 12B:
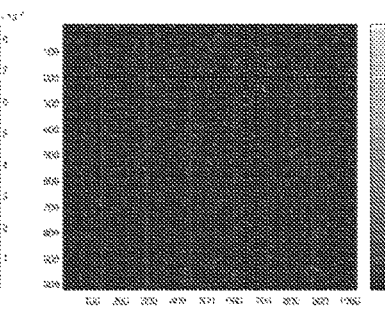
FIG. 12b is a graph showing a map of extracted conductivity value for $\sigma_y$ processed based on the backward scans in the example in FIG. 7b according to an embodiment.
Figure 12C:
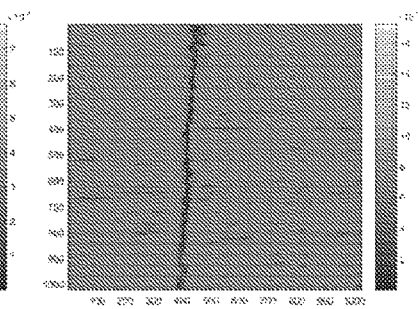
FIG. 12c is a graph showing a map of preprocessed data based on the extracted conductivity values in the examples in FIGS. 12a and 12b according to an embodiment.
Figure 13:
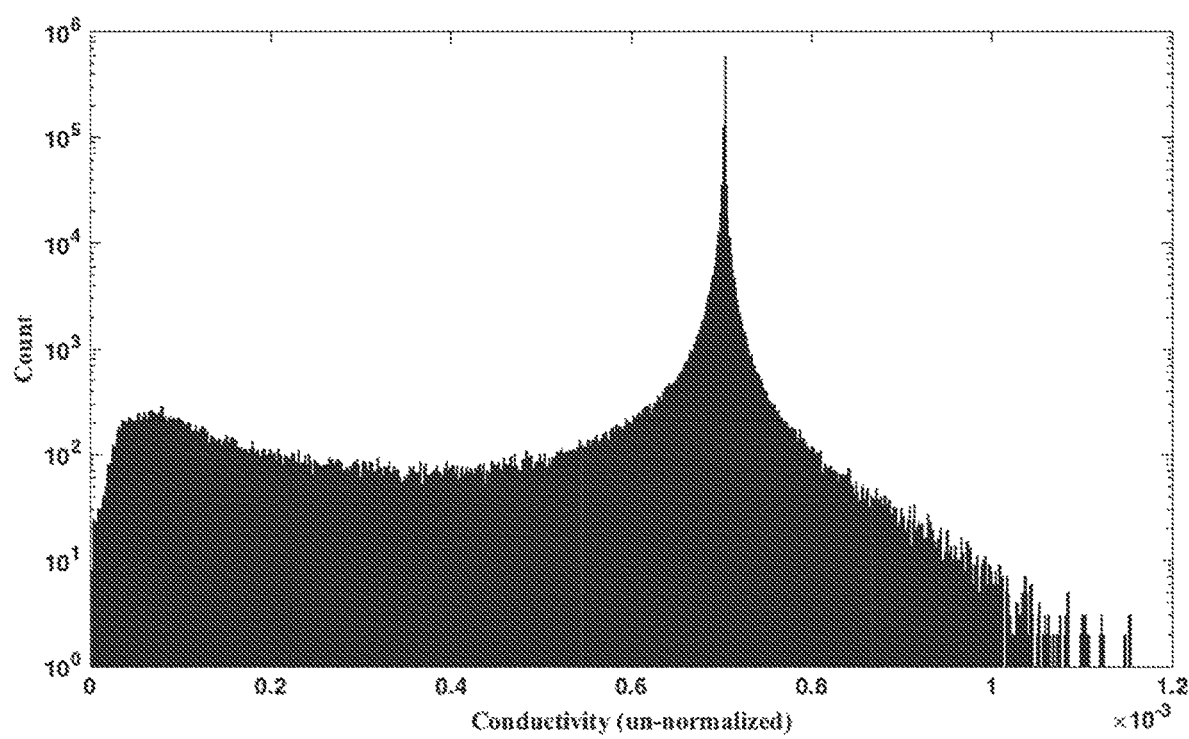
FIG. 13 is a histogram plot showing the statistical distribution of the values of un-normalized $\sigma_x$, according to an embodiment.

The extracted conductivity maps for $\sigma_x$ and $\sigma_y$ are shown in FIGS. 11 and 12, respectively. We compare results from the proposed reconstruction algorithm on the original forward (panel a), backward data (panel b), and the preprocessed data (panel c). In all cases the raw data without preprocessing failed to yield any meaningful result. This is not surprising considering that the original data are very noisy and the matrix A involves up to the second derivatives of the data. With preprocessing applied, both $\sigma_x$ and $\sigma_y$ converged to physically meaningful results, with high conductivity on the plateau and low conductivity at the grain boundary. In FIG. 13 we show a histogram plot of the distribution of the values of the un-normalized $\sigma_x$. The high peak at about 0.7 represents the high conductivity within the graphene sheet. There is a second small peak at about 0.08. This corresponds to the grain boundary conductivity. The ratio between the two values is 0.12.

Example Computing Environment

The processing as described herein may be performed in any suitable computing environment. Depending on the nature of the computing device, one or more additional elements may be present. For example, a smart phone or other portable electronic device may include a camera, capable of capturing still or video images. In some embodiments, a computing device may include sensors such as a global positioning system (GPS) to sense location and inertial sensors such as a compass, an inclinometer and/o ran accelerometer. The operating system may include utilities to control these devices to capture data from them and make it available to applications executing on the computing device.

As another example, in some embodiments, a computing device may include a network interface to implement a personal area network. Such an interface may operate in accordance with any suitable technology, including a Bluetooth, Zigbee or an 802.11 ad hoc mode, for example.

Having thus described several aspects of at least one embodiment of this invention, it is to be appreciated that various alterations, modifications, and improvements will readily occur to those skilled in the art. For example, the system and method disclosed in the present application may be further adapted to characterization of such properties as magnetization, thermovoltage, spin current, etc. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "code", "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A scanning probe microscope system for forming an image of a sample surface, the scanning probe microscope system comprising:
   a scanning probe tip configured to provide an output representing a characteristic of the sample surface adjacent the scanning probe tip;
   a scan controller configured to control motion of the scanning probe tip along a plurality of scan paths in a scan area on the sample surface, wherein:
   each of the plurality of scan paths comprises a first scan path portion along a first scan direction and a respective second scan path portion along a second scan direction opposite the first scan direction such that the scan controller outputs scan traces corresponding to each of the first scan path portion and the second scan path portion in the plurality of scan paths; and
   one or more processors configured to receive scan traces from the scan controller and compute a scanning probe microscope image of the scan area, wherein:
   the one or more processors are configured to compute the scanning probe microscope image from the scan traces by computing data representing lines of the scanning probe microscope image from data in the scan paths based on scan traces corresponding to the first scan path portion and the respective second scan path portion in respective scan path of the plurality of scan paths, wherein:
   computing data representing a line of the scanning probe microscope image comprises (1) aligning a first scan trace corresponding to the first scan path portion of a scan path of the plurality of scan paths with a second scan trace corresponding to the respective second scan path portion of the scan path based on at least one feature in the first scan trace and a corresponding feature in the second scan trace, (2) generating weighting factors based on the aligned first scan trace and the aligned second scan trace, and (3) computing a value for pixels in the line by combining the value of the aligned first scan trace representing the corresponding pixel location with the value of the aligned second scan trace at the corresponding pixel location based, at least in part, on the generated weighting factors, and
   the scanning probe microscope image comprises a plurality of pixels and each scan path comprises a plurality of pixel positions corresponding essentially to pixels in the scanning probe microscope image.

2. The scanning probe microscope system of claim 1, wherein:
   the scan controller is configured to move the scanning probe tip along the plurality of scan paths at a scan rate of at least 10 pixels per millisecond while the scan traces are being generated.

3. The scanning probe microscope system of claim 1, wherein aligning the first scan trace with the second scan trace comprises performing an inverse consistent deformable image registration.

4. The scanning probe microscope system of claim 1, wherein generating weighting factors comprises generating weighting factors for the aligned first scan trace and the aligned second scan trace at each location along the scan path based on the smoothness of each of the scan traces at the location.

5. The scanning probe microscope system of claim 4, wherein generating weighting factors based on the smoothness of each of the scan traces at the location comprises generating weighting factors such that the scan trace with a generally higher smoothness around the location is assigned a higher value.

6. The scanning probe microscope system of claim 1, wherein computing data representing a line of the scanning probe microscope image comprises: computing a value for pixels in the line by averaging the value of the aligned first scan trace representing the corresponding pixel location with the value of the aligned second scan trace at the corresponding pixel location.

7. The scanning probe microscope system of claim 1, wherein:
the characteristic of the sample surface is topological height relative to a plane in the scan area, and
the scanning probe microscope image is a topological height map.

8. The scanning probe microscope system of claim 1, wherein:
the characteristic of the sample surface is surface potential, and
the scanning probe microscope image is a potentiometry map.

9. The scanning probe microscope system of claim 8, wherein the one or more processors are further configured to:
extract, from the potentiometry map, a conductivity map.

10. The scanning probe microscope system of claim 1, wherein:
the characteristic of the sample surface is surface thermovoltage potential, and
the scanning probe microscope image is a thermovoltage map.

11. The scanning probe microscope system of claim 1, wherein:
the characteristic of the sample surface is surface magnetization, and
the scanning probe microscope image is a magnetization map.

12. The scanning probe microscope system of claim 1, further comprising:
at least one display coupled to the one or more processors to receive the scanning probe microscope image from the one or more processors.

13. A method of processing scanning probe microscope data with one or more processors, the scanning probe microscope data comprising a plurality of scan traces representing a characteristic of a sample surface measured at locations along a plurality of scan paths in a scan area, wherein each of the plurality of scan paths comprises a first scan path portion along a first scan direction and a second scan path portion along a second scan direction opposite the first scan direction, wherein the plurality of scan traces comprise a first scan trace along the first scan path portion and a second scan trace along the second scan path portion of at least one scan path of the plurality of scan paths, the method comprising:
aligning the first scan trace and the second scan trace such that the location of at least one feature in the aligned first scan trace is aligned with the location of at least one corresponding feature in the aligned second scan trace;
generating weighting factors based on the aligned first scan trace and the aligned second scan trace;
combining the aligned first scan trace with the aligned second scan trace based, at least in part, on the generated weighting factors to produce a processed scan trace along the at least one scan path; and
producing, by the one or more processors, a scanning probe microscope image, based at least in part on the processed scan trace.

14. The method of claim 13, wherein aligning the first scan trace and the second scan trace comprises performing an inverse consistent deformable image registration.

15. The method of claim 13, wherein generating weighting factors comprises generating weighting factors for the aligned first scan trace and the aligned second scan trace at each location along the scan path based on the smoothness of each of the scan traces at the location.

16. The method of claim 15, wherein generating weighting factors based on the smoothness of each of the scan traces at the location comprises generating weighting factors such that the scan trace with a generally higher smoothness around the location is assigned a higher value.

17. The method of claim 13, wherein:
the characteristic of the sample surface is topological height relative to a plane in the scan area, and
the scanning probe microscope image is a topological height map.

18. The method of claim 13, wherein:
the characteristic of the sample surface is surface potential, and
the scanning probe microscope image is a potentiometry map, wherein the method further comprises:
extracting, from the potentiometry map, a conductivity map.

19. The method of claim 13, wherein:
the characteristic of the sample surface is surface thermovoltage potential, and
the scanning probe microscope image is a thermovoltage map.

20. The method of claim 13, wherein:
the characteristic of the sample surface is surface magnetization, and
the scanning probe microscope image is a magnetization map.

21. A non-transitory computer-readable storage medium encoded with a plurality of instructions that, when executed by one or more processors associated with a scanning probe microscope system comprising a scan controller and a scanning probe tip, perform a method comprising:
receiving, scan traces representing a characteristic of the sample surface measured at scanning probe tip locations along a plurality of scan paths in a scan area, wherein:
each of the plurality of scan paths comprises a first scan path portion along a first scan direction and a second scan path portion along a second scan direction opposite the first scan direction;
aligning a first scan trace along the first scan path portion and a second scan trace along the second scan path portion of at least one scan path of the plurality of scan paths such that the location of at least one feature in the aligned first scan trace is substantially aligned with the location of at least one corresponding feature in the aligned second scan trace;
generating weighting factors based on the aligned first scan trace and the aligned second scan trace;
combining the aligned first scan trace with the aligned second scan trace based, at least in part, on the generated weighting factors to produce a processed scan trace along the at least one scan path; and
producing, a scanning probe microscope image based at least in part on the processed scan trace.

22. The non-transitory computer-readable storage medium of claim 21, wherein aligning the first scan trace and the second scan trace comprises performing an inverse consistent deformable image registration.

23. The non-transitory computer-readable storage medium of claim 21, wherein generating weighting factors comprises generating weighting factors for the aligned first scan trace and the aligned second scan trace at each location along the scan path based on the smoothness of each of the scan traces at the location.

24. The non-transitory computer-readable storage medium of claim 23, wherein generating weighting factors based on the smoothness of each of the scan traces at the location comprises generating weighting factors such that the scan trace with a generally higher smoothness around the location is assigned a higher value.

25. The non-transitory computer-readable storage medium of claim 21, wherein:
- the characteristic of the sample surface is surface potential, and
- the scanning probe microscope image is a potentiometry map, wherein the method further comprises:
- extracting, from the potentiometry map, a conductivity map.

* * * * *